United States Patent [19]
Stüben et al.
[11] 4,238,431
[45] Dec. 9, 1980

[54] METHOD FOR THE PRODUCTION OF TABLETS AND A TABLET PRESS

[75] Inventors: Werner Stüben, Büchen; Jürgen Hinzpeter, Schwarzenbek; Rudolf Deusch, Schwarzenbek; Konrad Friedrichs, Schwarzenbek, all of Fed. Rep. of Germany

[73] Assignee: Wilhelm Fette GmbH, Schwarzenbek, Fed. Rep. of Germany

[21] Appl. No.: 943,921

[22] Filed: Sep. 20, 1978

[30] Foreign Application Priority Data

Sep. 22, 1977 [DE] Fed. Rep. of Germany ....... 2742572

[51] Int. Cl.[3] .......... B29C 3/06

[52] U.S. Cl. .......... 264/40.5; 264/40.1; 425/145; 425/149

[58] Field of Search .......... 141/1, 11, 12, 69, 70, 141/81; 425/406, 149, 145; 264/40.5, 40.4, 40.1

[56] References Cited

U.S. PATENT DOCUMENTS

| | | | |
|---|---|---|---|
| 2,567,052 | 9/1951 | Carruthers | 141/12 |
| 3,255,716 | 6/1966 | Knoechel et al. | 264/40.4 |
| 3,734,663 | 5/1973 | Holm | 425/149 X |
| 4,121,289 | 10/1978 | Stiel | 264/40.1 X |

*Primary Examiner*—Frederick R. Schmidt
*Attorney, Agent, or Firm*—Michael J. Striker

[57] ABSTRACT

In a tablet press which includes a rotary disc provided with a plurality of dies and pistons engaging from below the dies, a filling wheel and a metering wheel arranged for a simultaneous rotation on the upper surface of the disc in the range of the dies, a vertically adjustable cam track on which the pistons ride, an electronic device for measuring pressing forces in the dies and control means for generating control impulses in response to the range of variations of the consecutive pressing forces, a method of producing uniform tablets by adjusting the rotary speed of the wheels according to the control pulses to minimize the variations of the pressing forces and subsequently adjusting the vertical position of the cam track and thus the weight of the tablets according to additional control pulses generated by comparing the average value of the measured compressing forces with a predetermined desired value.

5 Claims, 1 Drawing Figure

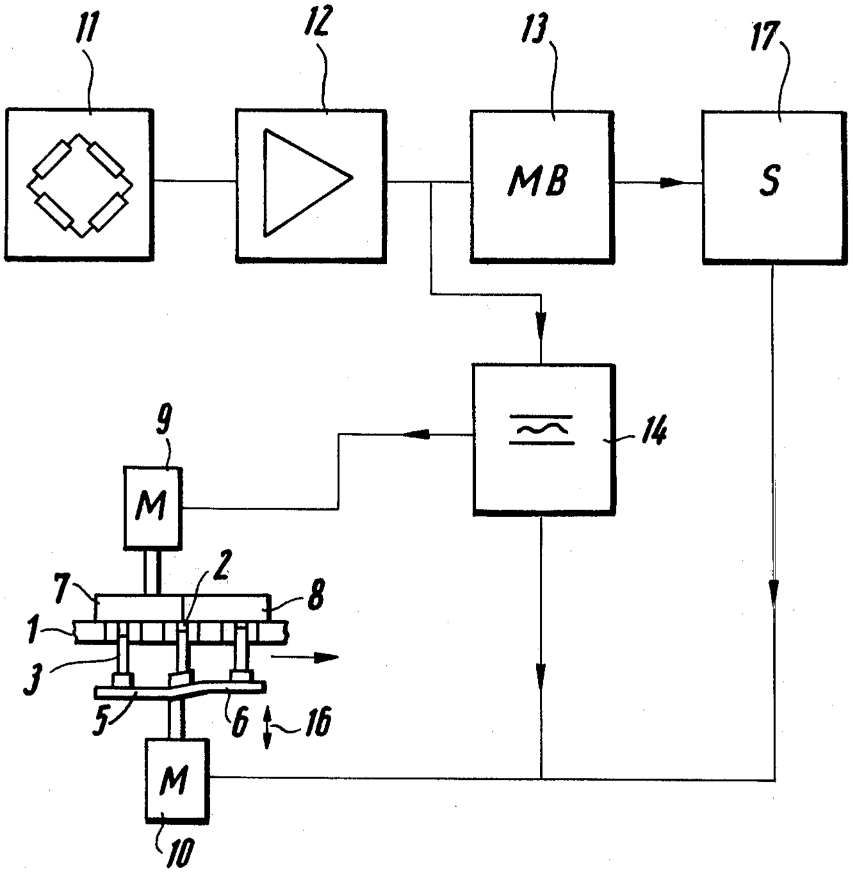
11
12
13
MB
17
S
14
9
M
2
7
8
1
3
5
6
16
M
10

METHOD FOR THE PRODUCTION OF TABLETS AND A TABLET PRESS

BACKGROUND OF THE INVENTION

The invention relates to a method for the production of tablets by means of a tablet press which includes a filling arrangement with a rotating filling wheel and metering wheel, the speed of rotation of which is adjustable, as well as an elevation-adjustable metering cam track on which the lower pistons of the tablet press ride, and an electronic measuring arrangement for the measuring of the pressing forces. In addition thereto, the invention relates to a tablet press.

In the production of tablets, it is desired that the tablets possess the same weight which corresponds, to the utmost extent, to the required weight and, beyond this, that the production of the individual tablets be performed under the influence of pressing forces which have a predetermined value and which are, to the largest possible extent, the same.

The pressing force is significant, among others, for the reason that the time of the dissolution or of the disintegration of the tablet depends on the same. When the pressing force is, for instance, too high, the tablet, under certain conditions, becomes dissolved when it has already left the stomach and is located in the intestine. The effect of such a tablet is different from that of a tablet having the same weight, but which has been produced under the influence of a lesser pressing force and, as a consequence thereof, dissolves more rapidly.

In addition thereto, the structural strength of the tablet depends on the pressing force, too. A certain structural strength of the tablet is required for the subsequent processing of the tablets, for example, in dragée vessels, and during the packaging. When the pressing force is, for instance, too low, the tablet will disintegrate even when subjected only to small loads. When the pressing force is too high, then the tablet is likely to disintegrate in layers. The experts refer to this phenomenon as "cleaving" of the tablets.

The weight of the tablets depends on the bulk density of the granulated material in the female die, as well as on the specific weight thereof. In addition thereto, the weight of the tablet depends on the filling amount, or on the free volume of the female die which is being filled with a granulated material as the female die, which is arranged in a rotating female die disk, passes through the filling arrangement. Therefore, the filling amount is determined by the position of the lower piston which extends into the female die from below and, in addition thereto, by the manner of the filling, or the speed of the filling of the female die.

For a complete filling of a female die during a speedy rotation of the female die disk, the conventional table presses possess a filling wheel and a metering wheel, which are being driven in opposite directions. Underneath the filling wheel, there is arranged a rail-like filling cam track and, underneath the metering wheel, a rail-like metering cam track which is situated at a somewhat higher elevation. These two cam tracks can be constructed as a one-piece rail which is arranged for adjustment of elevation (DT-OS No. 22 51 - 832). However, they also can be constructed in two parts, so that the metering cam track is elevationally adjustable with respect to the filling cam track as well.

When, during the production of a tablet, the corresponding female die enters the filling arrangement, the associated lower piston is being held at a lower elevation in the region of the filling wheel by the filling cam track, than in the succeeding region of the metering wheel in which it is being lifted by riding along the metering cam track. Therefore, after the granulated material for the production of the tablet has been filled into the female die by the filling wheel in the first partial section of the filling arrangement, a part of the same is upwardly expelled from the female die as a result of the lifting of the lower piston, and is wiped off by the metering wheel on the female die disk. This is accomplished in order to assure a complete filling of the female die. However, it has been established, especially in rapidly advancing tablet presses, that the bulk densities vary in a certain range when the speed of rotation of the filling and metering wheel is changed, or even the speed of rotation of the female die table. Thus, different filling amounts and, therefore, filling weights, result at different rotational speeds of the filling wheel. Consequently, the filling weights depend, on the one hand, on the controllable speed of rotation of the filling wheel and the metering wheel—both have, as a rule, the same speed of rotation—and on the elevational position of the lower piston, which can be influenced by an elevational adjustment of the filling and metering cam track, or exclusively of the metering cam track.

According to the DT-OS No. 22 51 832, it is known to compare the actual value of the pressing force being measured with a required value and to undertake a re-adjustment of the tablet weight in dependence thereon by an elevational adjustment of the metering cam track. By such an elevational adjustment of the metering cam track in itself, the tablet weight, it is granted, can be influenced more substantially than by a change in the rotational speed of the filling wheel. Despite this, the different speeds of rotation of the filling wheel are nevertheless of a considerable influence to the extent that, at certain speeds of rotation of the filling wheel, there result considerable weight variations between the tablets which are being produced in sequence while, on the other hand, the same tablet weights are obtainable only within a narrow range of the rotational speeds of the filling wheel. Therefore, it is expedient to utilize that speed of rotation of the filling arrangement which results in the lowest variations in the filling weight. However, this optimum speed of rotation is, in turn, again dependent of the size of the female die, or on the position of the lower piston.

In the mentioned conventional method of controlling the tablet weights under the utilization of the pressing forces, there is formed an average value of the pressing force from a plurality of pressing forces which have been determined in succession one after the other, which average value is compared with required limits and results in a cessation of operation of the machine when the latter are transgressed. Such a type of the control has not been shown to be complete. So, for instance, when the three determined values 10, 11, and 12, one after the other, are combined to an average value 11, and when the required value limits lie at 10 and 12, then the average value, as well as also all individual values, lie within these limits. However, when, under different assumptions, there are measured the values 1, 11, and 21, then there is also obtained, in fact, an average value 11 which is located between the permissible limits, even though, however, two of the three measured values are situated by far outside the permissible limits. Therefore, this known method does not take into consideration larger pressing force variations which do not find their reflection in an average value. On the other hand, if an undesired deviation of the actual value from the required value of the tablet weight was determined during the use of the known method, there resulted an automatic re-adjustment, or a manual one, by the elevational adjustment of the lower pistons or on the metering cam track. Pressing force variations, and thus tablet weight variations, which, accordingly, resulted, among others, from the respective rotational speed of the filling wheel, could not have, or have not, been taken into consideration therein. Besides, in any event, variations of the average value of the pressing force can be compensated for with time delays. As a consequence thereof, the variation width cannot be substantially influenced thereby.

SUMMARY OF THE INVENTION

It is an object of the invention to provide a method for the production of tablets, which have the same weight which, to the largest possible extent, corresponds to a predetermined required value, and which are all being pressed under the same, or to the largest possible extent the same, pressing force.

According to the invention, a solution of this objective has been found in that:

(a) the speed of rotation of the filling and metering wheel is automatically controlled, by an electronic control arrangement, in dependence on the measured pressing forces, to a value at which the smallest pressing force variations occur, (b) in a known manner, the actual value of the pressing force is compared with a required value and, in dependence thereon, there results a subsequent control of the tablet weight by an elevational adjustment of the metering cam track, and (c) thereafter, the speed of rotation of the filling and metering wheel is again controlled in dependence on the measured pressing forces.

As a result of the utilization of this method, the above-described disadvantages are avoided, inasmuch as pressing force variations are avoided, to the largest possible extent, by the control of the speed of rotation of the filling wheel, even in the region in which the actual state of the average value of the pressing forces is accommodated, to the utmost extent, to the required value. This is especially the case when the method is repeatedly performed at least at time intervals, on the basis of a continuous supervision of the pressing forces. The supervision of the pressing forces is achieved, on the one hand, by a continuous comparison of the individual pressing forces or of an average value formed therefrom or a statistical value, such as of the relative standard deviation, with the permissible limiting values in the sense of minimizing the variations by a suitable control of the speed of rotation of the filling wheel and, on the other hand, by a comparison of the obtained tablet weights based on a comparison of the pressing force average values as the actual value with a required value, and an elevational adjustment of the metering cam track derived therefrom.

In the practical application, the method according to the invention can be utilized, in other words, in such a manner that, at a certain elevational position of the metering cam track and at a predetermined speed of rotation of the female die disk, the speed of rotation of the filling wheel is changed for so long, until there result the smallest variations in the pressing forces which are measured after one another. As a result of this, it is granted, the equality of the pressing forces and thus of the weights of the tablets is optimized. However, the weight of these tablets, in most instances, deviates from the required weight. Therefore, after a comparison is made, the metering cam track is elevationally adjusted. This can, in turn result in increased variations of the individual pressing forces and these increased force variations can be again diminished by adjusting the speed of rotation of the filling wheel. However, inasmuch as also the filling amount and thus the filling weight is again minutely varied by the renewed readjustment of the filling arrangement, the method according to the invention is preferably performed in such a manner that the individual method steps occur alternatingly and repeatedly after one another. This is advantageous even when there is to be taken into consideration the danger that the constitution of the granulated material changes in the course of the operation of the tablet press, for instance, as a result of the particle size distribution of the tablet material.

Preferably, the method according to the invention is performed in such a manner that, after the achievement of the required value, the speed of rotation of the filling and metering wheels is changed in a stepwise manner in dependence on the measured pressing forces for so long, until the minimum of the pressing force variations is achieved. Herein, the individual steps are preferably taken in the same magnitude for so long, until the minimum of the pressing force variations is achieved or transgressed, wherein the step direction is reversed in such a case.

The practical expenditure for the utilization of the method according to the invention is relatively small, inasmuch as electronic switching and control arrangements, which are available in any event, need only be supplemented by a small number of electronic logical components in order to provide a tablet press according to the invention, which is characterized in that the measuring arrangement which is known by itself for measuring the pressing forces and which is equipped with a unit for forming an average value of the pressing forces, additionally includes a control component which is connected to the drive of the filling wheel and preferably, in addition thereto, to the adjustment mechanism of the metering cam track.

BRIEF DESCRIPTION OF THE DRAWING

The invention and advantageous embodiments of the same are explained in the following with reference to a drawing in which the filling arrangement of a tablet press and the measuring arrangement are diagrammatically presented.

DESCRIPTION OF A PREFERRED EMBODIMENT

The measuring apparatus which is diagrammatically illustrated in the drawing is designed for a rotary tabletting machine which includes a rotating female die disk 1. Female dies 2 are arranged in the female die disk 1, and a lower pistons 3 respectively extend into the same from underneath. In the region of the filling station of the tablet press, which is illustrated in the lower part of the drawing, the lower pistons 3 enter upon a rail-like cam track, a first section of which forms the filling cam track 5 and a second section the metering cam track 6.

Of these two, the metering cam track 6 is situated somewhat higher than the filling cam track 5.

In the region of the filling cam track 5, there is situated upwardly of the female die disk 1 the filling wheel 7, and in the region of the metering cam track 6, there is situated upwardly of the female die disk 1 the metering wheel 8 which engages the filling wheel 7. The speed of rotation of the filling wheel 7 and, consequently, of the metering wheel 8, is controllable by means of a motor 9 which in turn is controlled by a control unit 14.

The elevation of the filling and metering cam tracks 5 and 6 can be adjusted by means of a second motor 10, and this vertical adjustment takes place, for example, in a control range of 3 millimeters, in correspondence with the double-headed arrow 16, while the speed of rotation of the filling and metering wheels 7 and 8 can be controlled between 5 and 100 revolutions per minute.

The production of tablets of the same weight, which corresponds to a required weight, and under the utilization of the same pressing forces, is accomplished by the evaluation of the measured forces which are dependent of the weight of the pressed tablets.

During the operation of the tablet press, each piston station emits, during each pressing operation, via dilation measuring strips which are arranged in a full bridge circuit of the measuring unit (11) a pressing force signal which is to be evaluated. These pressing force signals are directly and automatically processed in an electronic circuit arrangement 12, 13, 14 and 17 for controlling the speed of rotation of the filling wheel 7 and the elevation of the metering cam track 6. To this end, an average value is formed, after amplification in the amplifier 12, from the individual signals, in the average value former 13 (MB), which average value can be compared in the control unit 14 with positively adjustable average value limits. In addition thereto, the maximums and minimums of all individual values can be compared in the unit 14 adjustable individual value limits, or the standard deviation with adjustable limits. This control part or unit 14 which is effective in the manner of a comparator is connected to the driving motor 9 as well as to the servo-motor 10 for adjusting the vertical position of the metering cam track 6. Therefore, the speed of rotation of the filling wheel 7 as well as the position of the lower pistons 3 and, consequently, the magnitude of the female die spaces, can be controlled by means of the unit 14. The control unit 14 controls the metering adjustment only in the event when, in accordance with experience, it is known that by the adjustment of the motor 9 a certain adjustment of the dosing amount must take place by the adjustment of the motor 9.

In addition thereto, the elevational adjustment of the metering cam track 6 is performed, in a conventional manner, via the signal emitter 17. In this signal emitter 17, the determined pressing force average value is compared with the required value. When the deviation lies outside predetermined limits, a subsequent control is performed by means of the signal emitter 17.

During the initiation of the operation of the tablet press, the driving motor 9 of the filling wheel 7 is so controlled, after the reaching of a predetermined female die rotational speed, by means of the control unit 14, that the differences between the measured individual pressing forces are minimum. This is achieved in such a manner that the range of variations of the individual pressing forces is determined in the control unit 14. Thereafter, there is performed a first adjustment step by applying a control impulse from the output of unit 14 to the motor 9. Subsequently thereto, the variation range is again determined. Now, should this variation range be greater, the unit 14 generates two control impulses of an opposite polarity, in order to control the speed of motor 9 toward the minimum variations of the compressing forces in the opposite direction. Thereafter, the individual pressing forces are again measured and compared and, subsequently, controlling impulses are being issued for so long, until the minimum is transgressed. Subsequently thereto, the direction of control impulses is again reversed. Herein, the control arrangement can also be set up in such a way that a diminution of the magnitude of the control impulses is also automatically obtained during a reversal of its direction. A comparison of the pressing force average value which is obtained thereafter with the predetermined required value of the pressing force, however, results occasionally in the determination of an undesired deviation, and the produced tablet weights do not correspond to the desired ones. In order to account for this, there is performed an adjustment of the metering cam track 6 so that a different free size of the female die results from a change in the vertical portion of lower pistons 3, which in turn results in other tablet weights. However, the rotational speed of the filling wheel must be again accommodated to this renewed position of the lower pistons, inasmuch as renewedly higher variations between the individual pressing forces to be measured can occur after a change of the position of the lower pistons. As a consequence hereof, the one method step pulls the other method step after itself wherein, however, the individual method steps can timewise transit into one another.

What is claimed as new and desired to be protected by Letters Patent is set forth in the appended claims:

1. A method for the production of uniform tablets by means of a tablet press which includes a rotary disc provided with a plurality of dies and pistons engaging from below respective dies, a filling wheel and a metering wheel arranged for simultaneous rotation on the upper surface of the disc in the range of the dies, a vertically adjustable cam track, on which the pistons ride, having a section of less vertical displacement and a section of greater vertical displacement which raises the pistons so that the pressure is exerted by the pistons pressing the tablet forming material against a position of the metering wheel, an electronic device for measuring individual pressing forces in said dies, variations in said pressing forces being caused by, among other factors, fluctuating bulk densities in the tablet-forming material in the die due to the varying of the rotary speeds of the filling and metering wheels, an electronic device which amplifies the electronic measuring device output, a first electronic control device which receives a portion of the amplifier output, compares said output with a predetermined required pressing force value and emits control impulses based upon said amplifier output and said predetermined required pressing force value, an electronic signal averager which receives the remaining portion of said amplifier output and averages said output, a second electronic control device, also emitting control impulses which compares the signal averager output with a predetermined average pressing force valve representing the required average pressing force which is related to the vertical displacement of the pistons as controlled by the vertical position of the cam track, comprising the steps of:

(a) adjusting the rotary speed of said wheels in accordance with said control impulses, originating from the first electronic control device, in order to minimize the variations of the pressing forces exerted against the forming tablet in the die due to the action of the cam track; and (b) adjusting the vertical position of said cam track so in response to control impulses generated by either both control devices or solely by the second control device so that the pressure exerted by the piston upon the tablet forming material in the die is altered by raising or lowering the position of the pistons relative to the die according to the difference between an average value of said pressing forces and a predetermined desired value so as to minimize differences in weight of respective tablets.

2. The method as defined in claim 1, wherein after attaining the predetermined required value of the average pressing forces the speed of rotation of said wheels is again readjusted by said control impulses in dependence on the measured pressing forces until minimum variations of the consecutive pressing forces are achieved.

3. The method as defined in claim 1, wherein the rotary speed of said wheels is adjusted according to the range of variations of consecutive pressing forces, as opposed to minimizing variations about a predetermined pressing force value, that is, correcting only if an individual pressing force departs from a predetermined range of values, and the vertical position of said cam track is adjusted independently from said variations and according to the difference between the average value and the predetermined desired value of the pressing forces.

4. In a table press having a rotary disc provided with a plurality of dies and pistons engaging said die from below, a filling wheel and a metering wheel arranged for simultaneous rotation on the upper surface of said disc in the range of said dies, a vertically adjustable cam track on which said pistons ride, an electronic device for measuring individual pressing forces in said dies, an electronic amplifier which amplifies the output of the said electronic measuring device connecting thereafter with a control means for generating control impulses, a combination comprising said control means for generating control impulses corresponding to the variations of the consecutive pressing forces, and means for adjusting the rotary speed of said wheels and separate means for adjusting the vertical position of said cam track in response to said control impulse.

5. The combination as defined in claim 4, wherein said control means further includes means for averaging output signals from said electronic device and for comparing the average value to a predetermined desired value and for applying the difference between the two values to said means for the vertical adjustment of said cam track.

* * * * *